United States Patent [19]

Guillemot et al.

[11] Patent Number: 5,031,038
[45] Date of Patent: Jul. 9, 1991

[54] PROCESS AND DEVICE FOR THE COMPRESSION OF IMAGE DATA BY MATHEMATICAL TRANSFORMATION EFFECTED AT LOW COST, PARTICULARLY FOR THE TRANSMISSION AT A REDUCED RATE OF SEQUENCES OF IMAGES

[75] Inventors: Christine Guillemot; Jean-Claude Carlac'h, oth of Rennes; Pierre Duhamel, Issy Les Moulineaux, all of France

[73] Assignees: Etat Francais (CNET), Issy Les Moulineaux; Telediffusion de France, Montrouge Celex, both of France

[21] Appl. No.: 510,752

[22] Filed: Apr. 18, 1990

[30] Foreign Application Priority Data

Apr. 18, 1989 [FR] France .................. 89 05298

[51] Int. Cl.$^5$ .............................................. H04N 7/133
[52] U.S. Cl. .................................. 358/133; 358/136; 364/725
[58] Field of Search ................. 358/133, 136; 364/725

[56] References Cited

U.S. PATENT DOCUMENTS 4,302,775 11/1981 Widergren .......................... 358/136
4,708,761 10/1988 Daly .................................... 358/133

Primary Examiner—Howard W. Britton
Attorney, Agent, or Firm—Barnes & Thornburg

[57] ABSTRACT

Process and device for the compression of image data by a mathematical transformation implemented at low cost, particularly for the transmission at reduced speed of sequences of images.

The objective is to provide an economical method in "silicon area - processing speed" cost to implement a mathematical transformation of the DCT type, on arrays of pixels, suitable for image compression.

According to the invention, the method consists essentially of combining a permutation (1) of each block of pixels with a series of one dimensional FFT (211, 213). A series of variants is obtained by adding or not adding steps of matrix calculation (22) of reconstitution of a complex 2D-FET, of rotations (3) of reconstitution of the DCT, and/or of suppression of the imaginary coefficients.

10 Claims, 9 Drawing Sheets

ZIGZAG SCAN
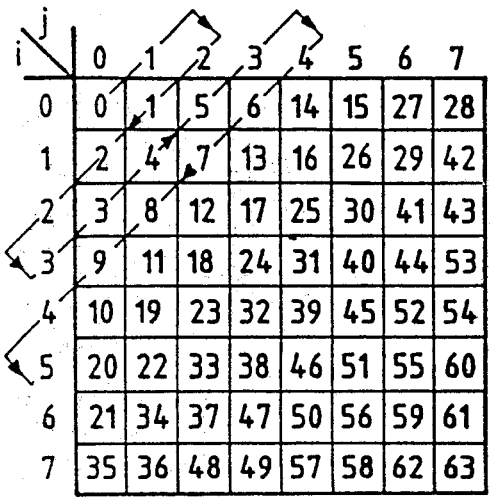
Fig. 1
LINE-TO-LINE SCAN
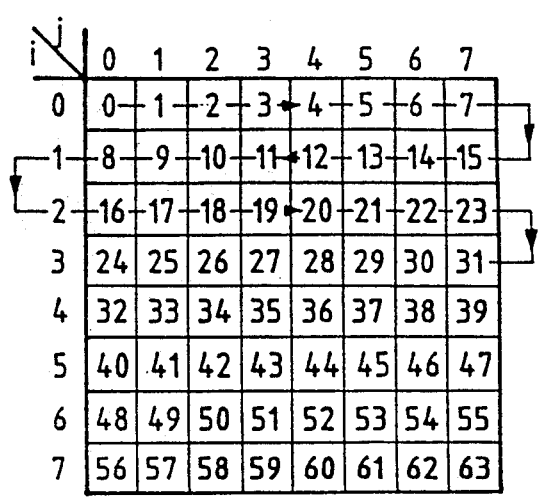
Fig. 2
(i,j) : TRANSCODED ADDRESS
| ni\nj | 0 | 1 | 2 | 3 | 4 | 5 | 6 | 7 |
|---|---|---|---|---|---|---|---|---|
| 0 | (0,0) | (0,1) | (1,0) | (2,0) | (1,1) | (0,2) | (0,3) | (1,2) |
| 1 | (2,1) | (3,0) | (4,0) | (3,1) | (2,2) | (1,3) | (0,4) | (0,5) |
| 2 | (1,4) | (2,3) | (3,2) | (4,1) | (5,0) | (6,0) | (5,1) | (4,2) |
| 3 | (3,3) | (2,4) | (1,5) | (0,6) | (0,7) | (1,6) | (2,5) | (3,4) |
| 4 | (4,3) | (5,2) | (6,1) | (7,0) | (7,1) | (6,2) | (5,3) | (4,4) |
| 5 | (3,5) | (2,6) | (1,7) | (2,7) | (3,6) | (4,5) | (5,4) | (6,3) |
| 6 | (7,2) | (7,3) | (6,4) | (5,5) | (4,6) | (3,7) | (4,7) | (5,6) |
| 7 | (6,5) | (7,4) | (7,5) | (6,6) | (5,7) | (6,7) | (7,6) | (7,7) |
Fig. 3
(ni,nj) : BINARY CODE FOR THE SEQUENCE NUMBER
n=8*ni+nj = SEQUENCE NUMBER
| i/j BEFORE | 0 | 1 | 2 | 3 | 4 | 5 | 6 | 7 |
|---|---|---|---|---|---|---|---|---|
| i/j AFTER | 0 | 7 | 1 | 6 | 2 | 5 | 3 | 4 |
Fig. 4

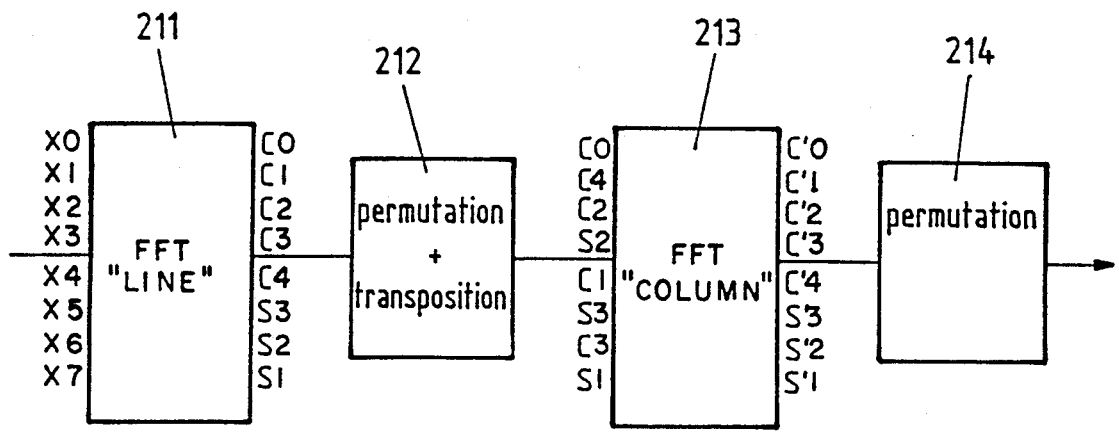
Fig. 5
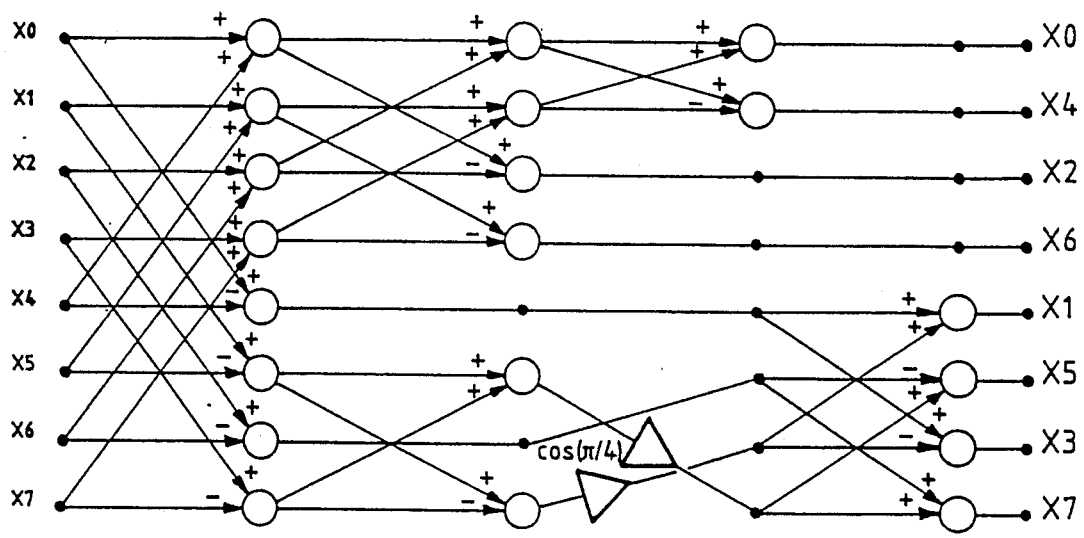
Fig. 6
| i/j | B2 | B1 | B0 | i'/j' | B'2 | B'1 | B'0 |
|---|---|---|---|---|---|---|---|
| 0 | 0 | 0 | 0 | 0 | 0 | 0 | 0 |
| 1 | 0 | 0 | 1 | 4 | 1 | 0 | 0 |
| 2 | 0 | 1 | 0 | 2 | 0 | 1 | 0 |
| 3 | 0 | 1 | 1 | 6 | 1 | 1 | 0 |
| 4 | 1 | 0 | 0 | 1 | 0 | 0 | 1 |
| 5 | 1 | 0 | 1 | 5 | 1 | 0 | 1 |
| 6 | 1 | 1 | 0 | 3 | 0 | 1 | 1 |
| 7 | 1 | 1 | 1 | 7 | 1 | 1 | 1 |
Fig. 7

| i | code i | | | i' | code i' | | |
|---|---|---|---|---|---|---|---|
| | B2 | B1 | B0 | | B'2 | B'1 | B'0 |
| 0 | 0 | 0 | 0 | 0 | 0 | 0 | 0 |
| 1 | 0 | 0 | 1 | 7 | 1 | 1 | 1 |
| 2 | 0 | 1 | 0 | 6 | 1 | 1 | 0 |
| 3 | 0 | 1 | 1 | 5 | 1 | 0 | 1 |
| 4 | 1 | 0 | 0 | 4 | 1 | 0 | 0 |
| 5 | 1 | 0 | 1 | 3 | 0 | 1 | 1 |
| 6 | 1 | 1 | 0 | 2 | 0 | 1 | 0 |
| 7 | 1 | 1 | 1 | 1 | 0 | 0 | 1 |

Fig. 10

| i \ j | 0 | 1 | 2 | 3 | 4 |
|---|---|---|---|---|---|
| 0 | F7 | F5 | F5 | F5 | F7 |
| 1 | F5 | F3 | F1 | F2 | F6 |
| 2 | F5 | F1 | F4 | F1 | F6 |
| 3 | F5 | F2 | F1 | F3 | F6 |
| 4 | F7 | F6 | F6 | F6 | F7 |

Fig. 11

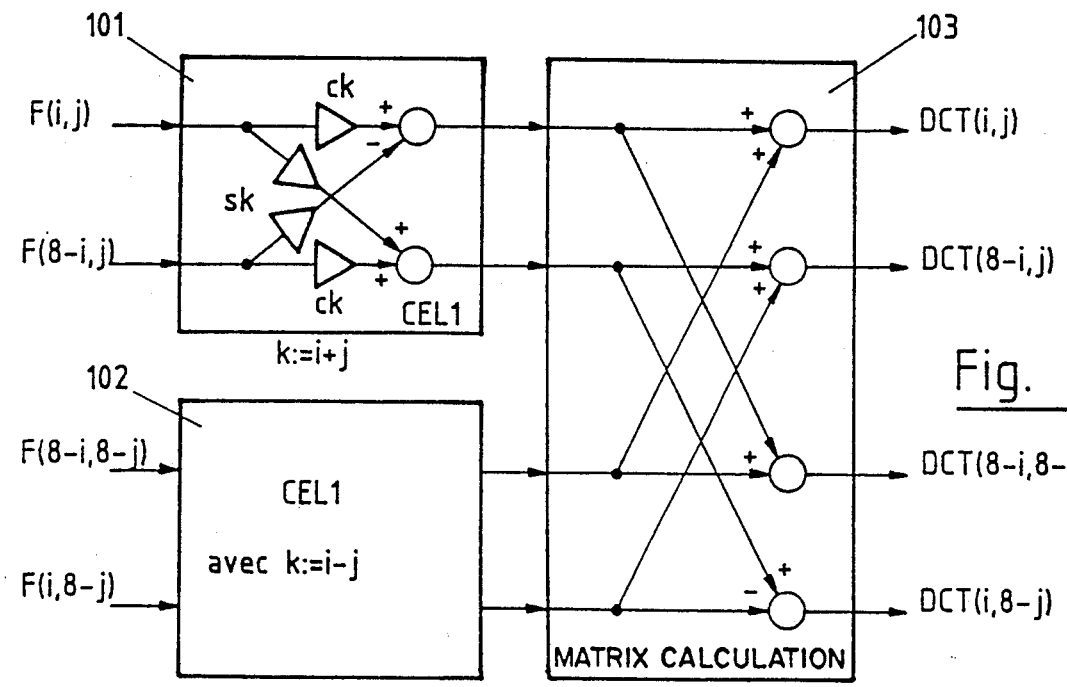
Fig. 12
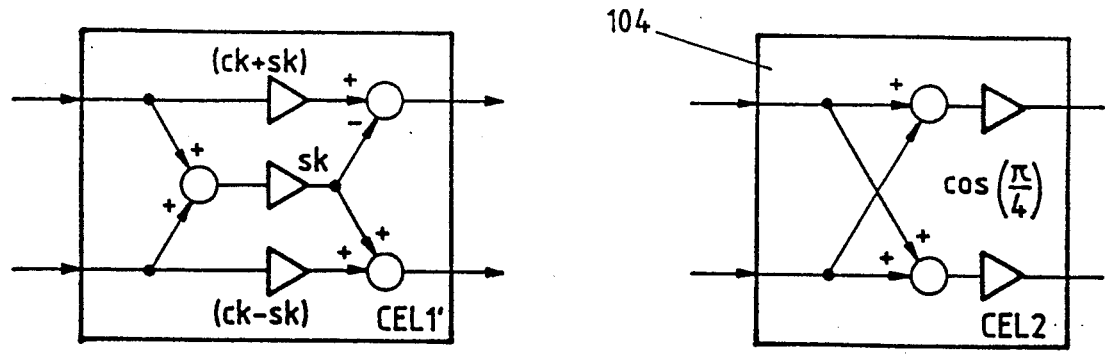
Fig. 13
Fig. 14

PROCESS AND DEVICE FOR THE COMPRESSION OF IMAGE DATA BY MATHEMATICAL TRANSFORMATION EFFECTED AT LOW COST, PARTICULARLY FOR THE TRANSMISSION AT A REDUCED RATE OF SEQUENCES OF IMAGES

BACKGROUND OF THE INVENTION

1. Field of the Invention

The invention relates to a process for the compression of data representative of an image signal, of the type consisting of decomposing the image into blocks forming arrays of pixels, of effecting a mathematical transformation operation on each array of pixels according to a transform that permits obtaining a resulting array of elements representative of the activity of the image, and of eliminating in each resulting array the elements of low psychovisual pertinence by thresholding in relation to an array of reference thresholds.

More specifically, the invention relates to a process of implementation of a new transform of the arrays of pixels, enabling the process of compression to be implemented at low cost.

The invention applies advantageously, but not exclusively, to the compression of images emitted in sequences of images at reduced rate, of the type used in audiovideography, photovideotex, telesurveillance, or in visiophony and visioconference on a switched telephone network, or on a digital network with service integration. However, the invention applies also to any other type of images or of sequences of images, including the coding of digital television pictures and even of high definition television.

2. Description of the Prior Art

Several laws of transformation of arrays of pixels are known, the principal laws being the Fast Fourier Transform, FFT, and the Discrete Cosine Transform, DCT. At least three parameters determine the choice of the transform, for a given application:

the rate of compression of the image signal;

the psychovisual quality of the image reconstituted from the compressed image signal; and the "processing speed x semiconductor area" cost of implementation of the transform on integrated circuit.

The DCT is generally the transform prefered today for the compression of images, because it permits a higher concentration of the "activity" ("energy") of the image than the FFT. In other words, the transformed array resulting from the CDT operation on the initial array of pixels, comprises fewer significant elements, from the psychovisual point of view. The amount of information relative to the image is therefore smaller, which permits the transmission of the image signal at a slower rate.

However, the implementation of the CDT on the arrays of pixels implies a "processing speed x semiconductor area" cost greater than that of the FFT. All the recent research of the experts in this area aimed therefore to find means to implement the CDT which minimizes this cost.

The CDT implemented on an image block N×N is expressed by the formula:

$$F(u,v) = 4 \frac{C(u)C(v)}{N^2} \sum_{i=0}^{n-1} \sum_{j=0}^{n-1} f(i,j) \frac{\cos(2i+1)\pi u}{2N} * \frac{\cos(2j+1)\pi v}{2N}$$

where:

i,j: spatial coordinates of the pixel array elements, u,v: coordinates of the coefficients of the transformed array, $C(u) = 1/\sqrt{2}$ if $u=0$, $C(v) = 1$ if $u \neq 0$, and f(i,j): amplitude of the pixel of coordinates (i,j).

The objective of the weighting coefficients C(u) and C(v) is to take into account the edge effect in the transformed block. The calculation of the double sum, effected systematically, leads to effect $N^2$ multiplications, multiplied by $N^2$ coefficients, or $N^4$ values to be summed.

Now, the cost of implementation of the DCT, on an integrated circuit, is tied directly to the number of additions and multiplications to be done. Further, it should be noted that the cost of a multiplication operation is about 5 to 7 times greater than that of an addition operation.

Two approaches have been tried to reduce the cost of implementation of the transform:

the decomposition of the lines/columns during implementation of the DCT on the array of pixels; and the implementation of the DCT directly in two dimensions, through a decomposition into elementary steps which in the aggregate is less expensive.

An illustration of the first approach is the method recommended by CHEN and others (see article W. H. CHEN, C. H. SMITH, S. C. FPALICK, "A fast computational algorithm for the Discrete Cosine Transform", IEEE Trans. on Communication, vol. COM-25, Sept. 1977). The method presented consists, essentially, of using the symmetries appearing in the transformation array to reduce the number of operations. The decomposition into lines/columns amounts to effecting successively two series of one dimentional transforms, successively on the lines, and on the columns of the array respectively. The intermediate array, between the two series of transformation, is subjected to a line/column transposition, so that the same mathematical index operations can be applied for the two series of transformations. The approach of CHEN makes it possible to reduce the cost of the DCT to 256 multiplications and 416 additions for arrays of 8×8 pixels.

Another method based on the same principle is described in the article of B. C LEE "A new algorithm to compute the discrete cosine Transform" (IEEE trans. ASSP vol. ASSP. 32). This approach is slightly less expensive, in the aggregate, for it requires only 192 multiplications, at the cost of a small increase of the number of additions (464 additions).

Finally, contrary to the preceding methods with direct factorizing, M. VETTERLI and H. NUSSBAUMER have proposed a method by decomposition of the DCT into elementary steps, in "Algorithmes de transformations de Fourier et en Cosinus mono et bidimensionnels" (Algorithms for Fourier and in Cosine one and two-dimensional transformations) (Ann. des Telecom. 40 n0 9-10, 1985). According to this method, the DCT is decomposed into three successive operations, which are:

a permutation of the elements of the initial array of pixels;

an FFT generated on the permuted array; and a series of rotations applied to the array transformed by the FFT, so as to obtain the final array corresponding to the DCT transform of the initial array of pixels.

The FFT on the permuted array is generated in the form of two series of one dimensional transformations, applied successively to the lines of the permuted initial array, then to the columns of the intermediate array resulting from the first series of one dimensional transformations. This method represents a cost of 464 additions, and of 192 multiplications, which can be reduced to 176 multiplications through arithmetical astuteness.

An additional gain has been obtained by VETTERLI, by means of a direct two-dimensional approach, based on the same type of decomposition into three successive operations (see the article "Fast 2-D Discrete Cosine Transform" ICASSP 1985). Contrary to the one dimensional approach, the permutation, FFT and rotation operations are effected directly in two dimensions. The FFT, in particular, is generated by an approach of polynomial transformation of the entire array. The cost of this two-dimensional method is interesting, since it is reduced to 104 multiplications and 460 additions.

SUMMARY OF THE INVENTION

This invention aims to provide a process to compress image data, by mathematical transformation of arrays of pixels, which makes it possible to obtain a still lower cost of implementation. Cost is a very important parameter in applications intended for distribution to the general public, requiring the purchase of image decoding terminals (photovideotex, HDTV, etc.).

More specifically, the inventors have discovered that it is not only possible to implement a DCT type transformation suitable for image compression, but also that certain variants of this method, even more economical, are quite satisfactory from the psychovisual point of view, and give better performance from the point of view of the compression ratio. These variants are particularly well adapted to image coding at slow speed, without being restricted to this type of application.

The process according to the invention has been specifically worked out for image coding at slow speed, and is particularly advantageous for processing image blocks in 4×4 pixel, 8×8 pixel or 16×16 pixel sizes. In the case of the most complex variant, corresponding to a new method to implement a DCT, the greater efficacy when compared with the VETTERLI method, can be explained, a posteriori, by the fact that the VETTERLI approach in two-dimensional DCT, while having a very low arithmetical complexity, has the drawback of applying a calculation structure that is not regular. The process of the invention has indeed both a low mathematical complexity and a regular structure, allowing a simple implementation and therefore a low cost material embodiment.

In addition, the invention can be implemented in a material device providing the best "frequency of operation/area of silicon" ratio, for a flow of data entering at 256 kHz (which corresponds to a transmission of fixed images coded at 0.25 bits per pixel (bpp) on networks at 64 kbits/s) as well as for a flow of data at 27 MHz (corresponding to the digital television data rate).

According to the invention, these advantageous characteristics are obtained by means of a process of compression of data representative of an image signal, of the type consisting of decomposing the image into blocks forming arrays of pixels, of effecting a mathematical operation of transformation on each array of pixels according to a transform to obtain a resulting array of elements representative of the activity of the image, and of eliminating in each resulting array the elements of low psychovisual relevance by thresholding in relation to an array of reference thresholds, the said mathematical operation of transformation being composed of a first step of transposition of the elements of the array of pixels by permutation of the indices of the said elements, so as to symmetrize the signal, followed by a second step of transformation of the transposed array, by fast Fourier transform (FFT).

As will be seen below, the FFT can be generated either by a two-dimensional approach, or by a one dimensional approach, conducted partially or totally according to its terms.

According to a first variant of the invention, the resulting array to which the compression thresholding is applied, then the coding, is the array obtained following the FFT, partial or total, applied to the transposed array of pixels. Advantageously, the FFT is effected by applying to the transposed array of pixels a chain of two series of one dimensional FFT with real values, bearing successively on each of the lines of the permuted array of pixels, then on each of the columns of the intermediate array resulting from the first series of one dimensional FFT. In this case, two sub-variants are obtained, depending on whether or not the chaining of the two series of one dimensional FFT is followed by the calculation matrix designed to reconstitute the array transformed by FFT with complex values corresponding to the said initial permuted array of pixels.

In these first two variants of the invention, surprisingly good psychovisual results are obtained, which indicates the preponderance of the permutation step, for the symmetrization of the signal in the chain of steps composed by VETTERLI to generate a DCT. This permits disregarding, possibly, the subsequent steps of VETTERLI.

However, in a third variant of the invention, it is possible to generate a complete DCT on the initial array of pixels. The new method of the invention consists of effecting this complete DCT by means of a two-dimensional approach for the permutation, and rotation, operations, but a one dimensional approach for the FFT operation. This double approach, two-dimensional and one dimensional, permits regularizing the succession of arithmetic operations. The gain does not result in a reduction of the cost in addition and subtraction operations, but rather in an advantage regarding the management of addresses in an implementation with an integrated circuit. This advantage proves to be the determining factor in improving the "processing speed/area of silicon" cost which is to be minimized.

According to a fourth and a fifth variant of the invention, the resulting array on which thresholding is effected, then coding, is either the array resulting from the DCT worked out according to the one directional approach, during which at least part of the imaginary coefficients obtained after at least one of the two series of one dimensional FFT with real value are cancelled (fourth variant), or the array resulting from a two-dimensional FFT in which the same type of partial or total cancellation of the imaginary coefficients was effected (fifth variant).

Other variants of the invention are also possible, particularly by combining the partial or total cancellation of the imaginary coefficients with the step of not conducting the DCT of the process of the invention. Other features and advantages of the invention will appear when reading the following description of preferred embodiments and the variants of the process of the invention, given only for illustration and as a non-limitative example, and the attached drawings.

BRIEF DESCRIPTION OF THE DRAWINGS

FIG. 1 shows a diagram of the mode of zigzag scanning of the blocks of coefficients prior to implementing, in decoding, the reverse process of the invention in case of a photovideotex type application.

FIG. 2 shows a diagram of the mode of line to line scanning of the blocks of pixels, during the preliminary step according to the process of the invention.

FIG. 3 shows a diagram of the content of the read-only memory for transcoding in zigzag scanning, on a block of coefficients.

FIG. 4 shows a diagram of the preliminary step of permutation by bit reverse for the permutation step according to the process of the invention.

FIG. 5 shows a diagram of succession of the four steps of one dimensional FFT line, and column, with inserted matrix transpositions, according to the process of the invention.

FIG. 6 is a butterfly graph illustrating the logic of generation of the one dimensional FFT, as implemented in the diagram of the FIG. 5.

FIG. 7 shows a diagram illustrating the sub-steps of matrix permutation by bit reverse, in the process illustrated in FIG. 5.

FIG. 10 shows a diagram of the rule to obtain the coefficients of the array N×N, symmetrical in relation to the point (N/2,N/2) by processing of the addressing bits of the said coefficients.

FIG. 11 localizes the seven families of final rotation of reconstitution of the DCT, according to the process of the invention.

FIGS. 12 to 17 are graphs illustrating certain aspects of the mode of implementation of the rotations, for each of the seven families localized in FIG. 11.

DESCRIPTION OF THE PREFERRED EMBODIMENTS

The process of compression of image data of the invention fits advantageously into a low rate fixed or mobile image coding process. Such a process consists essentially of the following steps:

The source image is cut into elementary blocks for processing. The block size corresponds advantageously to a compromise between: on the one hand, the need to obtain a sufficient level of decorrelation of the pixels, and therefore a size sufficientlY large for each block; and on the other hand, a size that is not too large for each block in order to minimize the processing complexities. In the embodiment presented below, the preliminary cutting up of the image is effected on 8×8 pixel blocks, but the invention can be applied to different block sizes.

A step of mathematical transformation is effected on each block cut out from the image. The transformation operation aims to concentrate the relevant data concerning each block of images, on a volume of information smaller than the array of pixels forming each source block. The transformation operation, often by means of an FFT or of a DCT, concentrates the energy of each block of images, generally, on at the most half of the block, except in case of blocks of images with high psychovisual complexity.

A step of thresholding, and of quantification of the information contained in the transformed blocks of images is then effected. The thresholding operation consists of eliminating from each transformed array the elements of information that are lower than experimentally determined thresholds of psychovisual perception. This is done by uperposing on each transformed array an array of threshold coefficients. This filtering operation by thresholding is followed by an operation of quantification of each filtered transformed block, which is represented by a closest configuration chosen in a dictionary of standard basic sub-images.

A step of coding, preferably of entropic coding, is then performed. (See for example the article "A method for the construction of minimum-redundancy codes", David A. HOFFMAN, proceedings of the I. R. E., September 1952, pages 1098 to 1101.) Other entropic codes than the HOFFMAN code can be used.

The implementation of the image data compression process of the invention described below relates to the step of transformation of the arrays of pixels, corresponding to 8×8 blocks, cut from a fixed or mobile image to be coded. Some of the steps of the image data compression process described below may be selectively preserved or eliminated, depending on system constraints and the performances required for each compression application.

Figure 20:
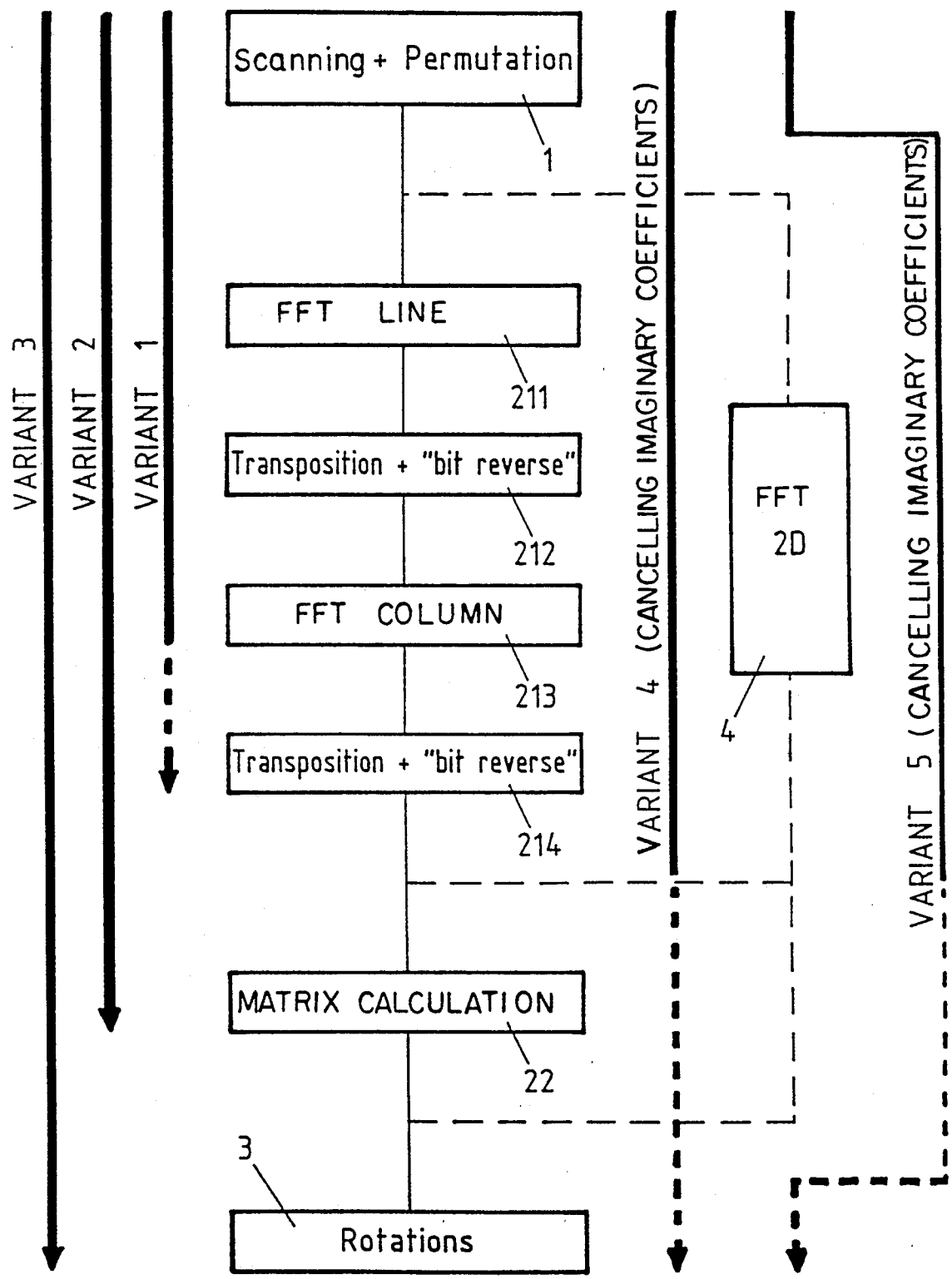
FIG. 20 is a diagram symbolizing the principal variants of the invention according to the steps of the process actually effected.

In the most complex embodiment of the invention, illustrated in FIG. 20, the process comprises the succession of the following steps:

(1) a transcoding operation of the source pixel arrays, effected advantageously in the form of permutations of pixels, combined with a television scan logic;

(2) a mathematical transformation of the transcoded array of pixels, by 2D-FFT with complex value, decomposed in the form of a double 1D-FFT with real value followed by a sub-step of reconstitution of the 2D-FFT with complex value, or more precisely:

(21) the double 1D-FFT with real value is effected advantageously as follows:

(211) a real FFT is performed on each of the lines of the transcoded array;

(212) a line/column matrix transposition is performed;

(213) a FFT with real value on each of the eight lines is obtained after transposition; and (214) line/column transposition of the array obtained in this manner;

(21) reconstitution of the array resulting from a 2D-FFT transformation with complex value, through a series of equations of arithmetic combinations of the coefficients of the array resulting from the double 1D-FFT with real value. The number of equations to be calculated is advantageously reduced by using the square symmetry of the Fourier transform of a real signal;

(3) —a reconstitution of the discrete cosine transform, advantageously in the form of a series of two-dimensional rotations. In a preferred embodiment of the invention, these two-dimensional rotations are achieved by regrouping the corresponding equations in seven distinct families, with homogeneous processing within each family.

The carrying out of all the steps and sub-steps described above corresponds to the embodiment of the invention that permits implementing an optimized DCT on the image blocks, at reduced "processing speed x semiconductor area" cost. However, as explained in the preamble, it is possible to eliminate selectively some of the steps, i.e.:

elimination of step 3 (DCT reconstitution rotations). In this case, the step 2 of generation of the complex FFT can be effected either by the succession of the steps 21 and 22 described above, or by the generation of an 2D-FFT with complex value according to the direct method recommended by VETTERLI.

elimination of step 21 of the matrix calculations for reconstitution of the complex 2D-FFT.

finally, in an even more simplifying variant, the imaginary coefficients coming from the 1D-FFT of the steps 211 and 213 can be cancelled. Such simplification is justified if the array of pixels corresponding to each image block carries a strongly correlated signal.

On the other hand, in the case of elimination of the step 213 of final rotations, and possibly of the step 212 of the calculation matrix, the invention covers also the variant in which the DCT generated in this manner comprises a step 4 of obtaining a 2D-FFT, complex or real respectively, instead of the pair of one dimensional FFT.

The preferred principle and a mode of implementation of each step of a complete variant of the invention will now will be defined more precisely.

Implementing the input permutation and transcodings

The permutation is the first operation to be performed. It is effected at the time the input data is entered into a memory of 64 words corresponding to an 8×8 block to be transformed, in combination with the scan operation of the elements of the array of pixels. The data of the 8×8 block is introduced according to a sequence that may be similar to the line to line television scan (FIG. 1) in case of the direct transform (at the transmission). At the reception, it will be noted that it is necessary, in order to generate the reverse transform, to effect a "zigzag" scan for the photovideotex, photosurveillance, visiophony applications (FIG. 2), while a simple line to line scan is suitable for decoding in television application. The addresses of the tables (in FIG. 1 and 2) are the line and column numbers of the reconstituted block and the content of the table is the number of the data in the sequence.

The television scan requires no address transcoding since, naturally, the sequence number=(8 * i)+j, i.e. the binary coded couple (i,j) is also the binary code of the sequence number. Transcoding of the zigzag scan is advantageously effected in a read-only memory (ROM) of 64 bit words whose input address is the sequence number and the output the couple (i,j) where the data is to be written. The content of the zigzag transcoding ROM is shown in FIG. 3.

The permutation proper consists of transforming each of the line and column indices i and j in the manner shown in the diagram, FIG. 4. This operation corresponds somewhat to a mixing of the coefficients, which symmetrizes the signal and permits, in a way, decorrelating the coefficients.

If i and j are coded on 3 bits B2, B1, B0 the new calculated indices i' and j' expressed on 3 bits B'2,B'1,B'0 are such that:

- B'0: = B0 + B1
- B'1: = B0 + B2
- B'2: = B0

FFT 8×8 with real values: (RVFFT)

As shown diagrammatically on the FIG. 5, the Fast Fourier Transform or FFT with real values is generated by using a real value FFT on each of the 8 lines (211), followed by an 8×8 matrix transposition (212), and finally by a second series (213) of FFT on the 8 lines obtained after the transposition, prior to new 8×8 matrix transposition (214).

It should be noted that in the embodiment of the invention consisting of eliminating the steps of matrix calculation (22) and of rotation (3), it is also possible to omit the step 214 of matrix transposition, provided that the array of psychovisual thresholds of the step of quantification of the coding be adapted, as well as the implementation of the reverse decoding transform.

FIG. 6 shows a diagram of the logic for generation of the one dimensional FFT in the form of a butterfly graph making it possible to obtain from the coefficients $(x0, \ldots x7)$ of the source line, transform coefficients $(X0, \ldots X7)$. As shown in FIG. 6, these indices $(X0, \ldots X7)$ are attributed by integrating the permutation consecutive to the one dimensional FFT.

The data resulting from the FFT with real value on each of the lines must be arranged in the bit reverse order (reversal of addressing bits) instead of the natural order. This bit reverse permutation inverts the bits of the line and column indices i and j, according to the process of the diagram of FIG. 7. It is not to be confused with the permutation effected on the input data. The combination of this permutation operation with the matrix transposition, in the steps 212, 214, requires no memory transfer (and therefore time), but merely a transformation of the address (i,j) into an address (i',j'). It is effected after each series of 8 real value FFT transformations in the form of the following operation:

$(i',j')$ = (bit reverse $(j)$, bit reverse $(i)$), with:
 $(i, j)$ address before permutation, and
 $(i',j')$ address after permutation.

The bit reverse permutation could also be effected at the input of the one dimensional FFT.

Figures 8, 9:
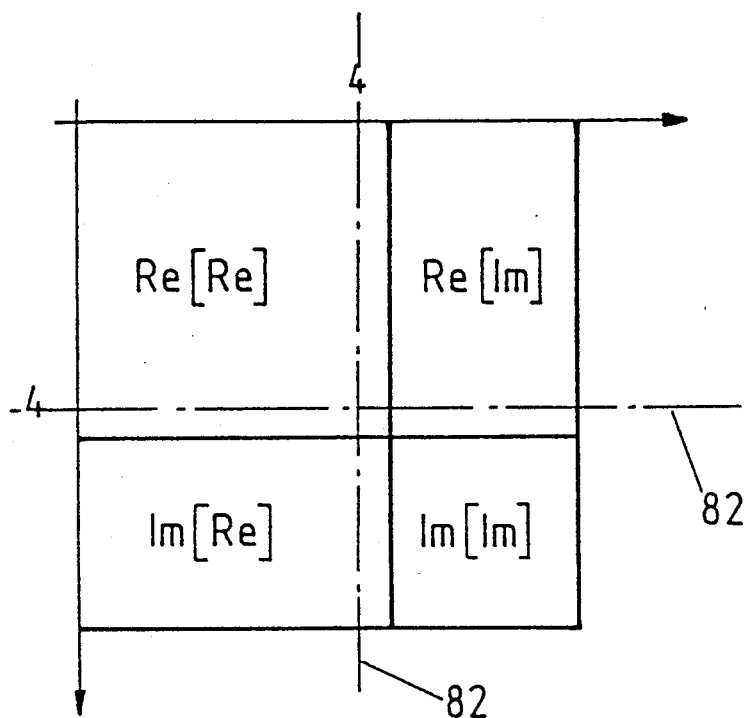
FIG. 8 illustrates the spatial distribution of the real and imaginary parts, in the array transformed by two one dimensional FFT with real value.
FIG. 9 shows a diagram of the operations performed in order to reconstitute the transformation values into a 2D-FFT with complex value, according to the geographic zones of the array.

Reconstitution of the 2D-FFT with complex values from the 2D-FFT with real values The outputs of the 1D-FFT with real values are, due to the square symmetry of the complex Fourier transform of a real signal, real parts (X0, X1, X2, X3, X4) and imaginary parts (X5, X6, X7), FIG. 8 illustrates the spatial distribution, in the transformed array RVFFT, of the real and imaginary parts. Note the square symmetries according to the axes i 81 and j 82. The coefficients of the transformed RVFFT array are the real data thus making it possible to reconstruct the coefficients of the complex Fourier transform, as follows:

$$2D-FFT = [Re(Re) - \epsilon_1\epsilon_2 Im(Im)] + j[\epsilon_2 Im(Re) + \epsilon_1 Re(Im)]$$

$$\quad\quad Re[2D-FFT] \quad\quad\quad Im[2D-FFT]$$

where:
- $\epsilon_1 = \pm 1$ according to the square symmetry
- $\epsilon_2 = \pm 1$ according to the square symmetry
- except: quadrant 1 (91) = $\epsilon_1 = \epsilon_2 = +1$ The notations Im[Re], Im[Im], Re[Re], Re[Re] are to be interpreted according to the following example:
example: Re[Re] = Re[1D-FFT[Re[1D-FFT]]]
where:
* 1D-FFT: results in the lines of 1D-FFT, and
* 1D-FFT[Re[1D-FFT]]: results in the columns of 1D-FFT.

To obtain in all cases the real and imaginary parts of the complex value 2D-FFT, the terms Re[Re], Re[Im], Im[Re], Im[Im] from the two series of real value 1D-FFT are simply replaced by the respective values of the diagram of FIG. 9, and according to the logic presented in Table I. The conditional branches presented in Table I identify the non-zero elements of calculation among Re[Re], Im[Re], Re[Im], Im[Im]. It will be noted that a certain number of simplifications can be introduced, especially due to the fact that the imaginary parts are zero for the elements 0 and 4.

The reconstitution is effected by taking into account the square symmetry that is again found in the two-dimensional case, and is a symmetry in relation to the couple (N/2, N/2), i.e. (4,4) when N=8. This permits deducing directly the complex values of the 2D-FFT of the 3rd and 4th quadrants 93 and 94 of FIG. 9, from those of the 1st and 2nd quadrants 91 and 92.

The calculations of the values of the complex value 2D-FFT from the outputs of the real value 2D-FFT cost in sum $4 \times (3 \times 3)$ additions/subtractions, or 36 additions/subtractions. The additions and subtractions are made by taking the two symmetrical words in relation to the point (4,4), the address of the symmetrical word is obtained by the address calculation of the diagram of FIG. 10, according to the following symmetry logic:
B'0:=B0 and B'1:=B0⊕B1

TABLE I if j = 0,4 then
  Im[1D-FFT (lines)] = 0
  if i = 0,4 then
    Im[1D-FFT (columns)] = 0
    only the term Re[Re] = 0
  fsi
  if i = 1,2,3 then
    Im[1D-FFT (columns)] = 0
    only Re[Re] = 0 and Im[Re] = 0
  fsi
fsi
if j = 1,2,3 then
  Im[1D-FFT (lines)] = 0
  if i = 0,4 then
    Im[1D-FFT (columns)] = 0
    only the terms Re[Re] = 0 and Re[Im] = 0
  fsi
  if i = 1,2,3, then
    all terms Re[Re] = 0, Re[Im] = 0
              Im[Re] = 0, Im[Im] = 0
  fsi
fsi

Final DCT reconstitution rotations

The values of the DCT 8×8 are deduced from the complex value FFT 8×8 by the following matrix equation:

$$\begin{bmatrix} DCT(i,j) \\ DCT(8-i,j) \\ DCT(i,8-j) \\ DCT(8-i,8-j) \end{bmatrix} = \begin{bmatrix} +1 & 0 & +1 & 0 \\ 0 & +1 & 0 & +1 \\ 0 & +1 & 0 & -1 \\ -1 & 0 & +1 & 0 \end{bmatrix} * \begin{bmatrix} ck & -sk & 0 & 0 \\ sk & -ck & 0 & 0 \\ 0 & 0 & ck & -sk \\ 0 & 0 & sk & ck \end{bmatrix} * \begin{bmatrix} Re(2D-FFT(i,j)) \\ Im(2D-FFT(i,j)) \\ Re(2D-FFT(i,8-j)) \\ Im(2D-FFT(i,8-j)) \end{bmatrix}$$

outputs DCT 8X8     array after rotation     2 rotations     outputs 2d-FFT 8X8 with complex values where $ck = \cos(k\pi/16)$ and $sk = \sin(k\pi/16)$ The particular values of the sk and ck lead to simplifications in the generation of the rotations and the above-described matric equation can therefore be put in seven different forms called "families". The seven families are located in the complex FFT array as shown in FIG. 11.

FIGS. 12 to 17 are graphs illustrating certain aspects of the modes of implementation of the rotations, for each of the seven families F1, F2, ... F7.

Family F1

It is the most general family, for without any simplification at all. Given sk:=sin(kπ/16) and ck:=cos(kπ/16). The graph of the FIG. 12 shows an embodiment with three cells: 101, 102, 103. The cell 102 is identical with the cell 101, but for a different value of the coefficient k (k=i+j, and k=i-j respectively for the cells 101 and 102). From the couple (i,j) on, it is necessary to use the symmetry in relation to 4 to obtain 8-i/8-j, that is:

| | |
|---|---|
| (i,j) | = (i,j) |
| (sym4(i),j) | = (8-i,j) |
| (sym4(i),sym4(j)) | = (8-i,8-j) |
| (i,sym4(j)) | = (i,8-j) |

The family F1 is generated for the couples (1,2), (2,1), (2,3), (3,2) according to the table:

| (i,j) | k=i+j | sk | ck | k=i−j | sk | ck |
|---|---|---|---|---|---|---|
| (1,2) | 3 | sin3π/16 | cos3π/16 | −1 | −sinπ/16 | cosπ/16 |
| (2,1) | 3 | sin3π/16 | cos3π/16 | +1 | sinπ/16 | cosπ/16 |
| (2,3) | 5 | sin5π/16 | cos5π/16 | −1 | −sinπ/16 | cosπ/16 |
| (3,2) | 5 | sin5π/16 | cos5π/16 | +1 | sinπ/16 | cos/π16 |

The family F1 uses the values sin(3π/16), sin(π/16), cos(π/16), cos(3π/16), sin(5π/16), cos(5π/16). To minimize the number of multiplications the cell CEL1 can be modified and shown in FIG. 13. The version of the FIG. 13 requires only three multiplications and three additions instead of four multiplications and two additions for the version of the FIG. 12.

For the other families, it would be possible to use the same general rotation as the one just described for the family F1. However, this would allow to increase the regularity of the algorithm by using the same rotation cell, at the cost of a slightly longer calculation time.

Family F2

This rotation is implemented for the couples (i,j)ϵ{(1,3),(3,1)}. Its graph is shown by implementing the cell 104 of FIG. 14, instead of the cell 101 of FIG. 12.

The family F2 uses the values sin(π/8) and cos(π/8) as well as cos(π/4), according to the table

| (i,j) | k=i+j | sk | ck |
|---|---|---|---|
| (1,3) | − | −sin(π8) | cos(π/8) |
| (3,1) | +2 | sin(π8) | cos(π/8) |

Family F3

Figure 15:
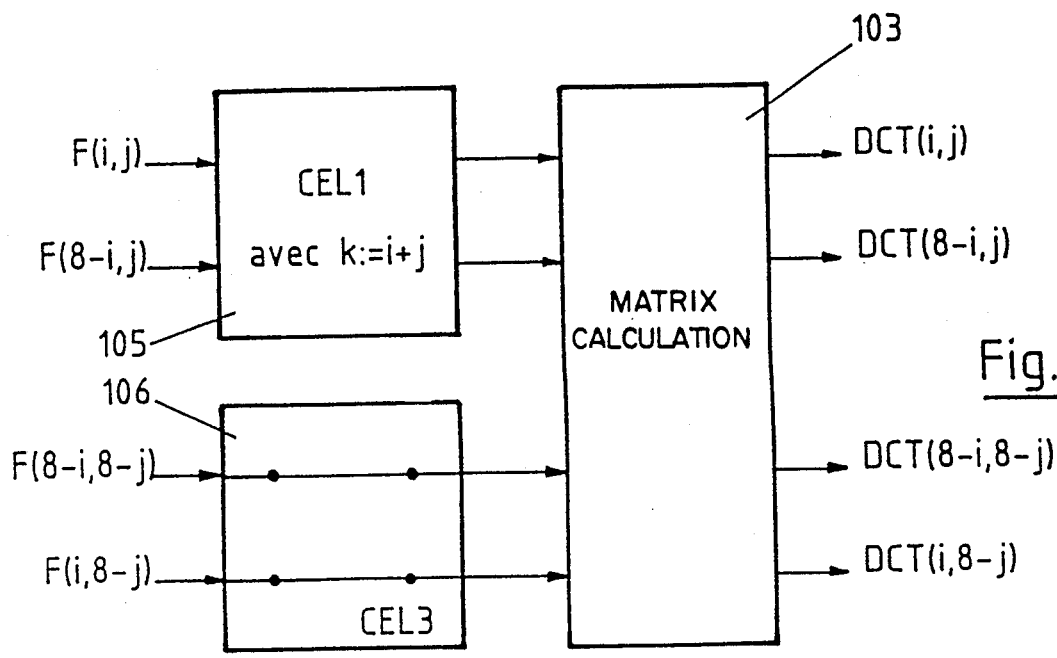

This rotation is effected for the couples (i,j)ϵ{(1,1),(3,3)}. As shown in FIG. 15, the cell 105 is identical with the cells 101 and 102 of FIG. 12 (and possibly with the equivalent cell of FIG. 13). The cell 106 consists of two lines without any specific processing. The family F3 uses the values sin(π/8), sin(3π/8), cos(π/8), cos(3π/8) according to the table

| (i,j) | k=−i+j | sk | ck |
|---|---|---|---|
| (1,1) | 2 | sin(π8) | cos(π/8) |
| (3,3) | 6 | sin(3π8) | cos(3π/8) |

Family F4

Figure 16:
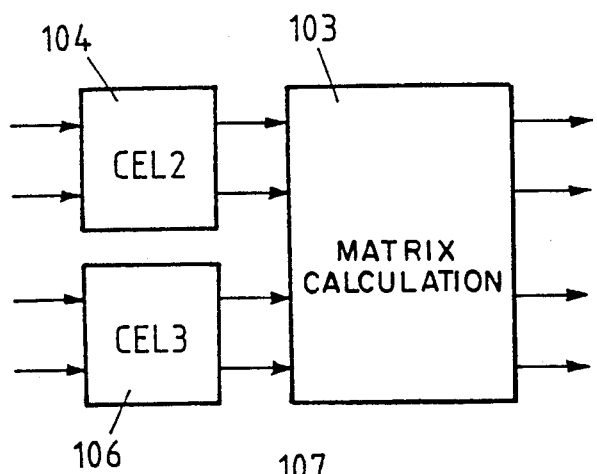

In this family, the rotation is achieved by the couple (i,j)=(2,2), according to the graph of FIG. 16. The supply cells for the matrix 103 are the cells 104 and 106 of FIGS. 14 and 15 respectively. The family F4 uses only the value cos(π/4).

Families F5 and F6

Figure 17:
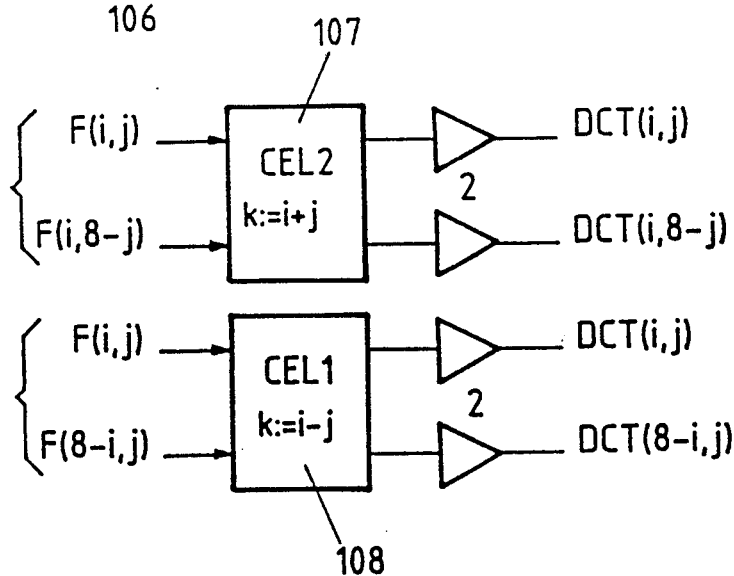

For the family F5, the rotation consists of effecting the multiplications by 2 instead of the calculation matrix 103 (FIG. 17). The cells 107, 108 are identical with those 101, 102 of FIGS. 12 and 13.

The family F5 corresponds to the couples (i,j) such as
i=0 and j=1,2,3
j=0 and i=1,2,3
and is effected according to the table

| (i,j) | k:i+j | sk | ck | k:=i−j | sk | ck |
|---|---|---|---|---|---|---|
| (0,1) | 1 | sin(π/16) | cos(π/16) | −1 | −sin(π/16) | cos(π/16) |
| (0,2) | 2 | sin(π/8) | cos(π/8) | −2 | −sin(π/8) | cos(π/8) |
| (0,3) | 3 | sin(3π/16) | cos(2π/16) | −3 | −sin(3π/16) | cos(3π/16) |
| (1,0) | 1 | sin(π/16) | cos(π/16) | 1 | sin(π/16) | cos(π/16) |
| (2,0) | 2 | sin(π/8) | cos(π/8) | 2 | sin(π/8) | cos(π/8) |
| (3,0) | 3 | sin(3π/16) | cos(3π/16) | 3 | sin(3π/16) | cos(3π/16) |

For the family F6, the rotation is limited to the cells 107 and 108 of FIG. 17, without using the multiplications by 2. The family F6 comprises the couples (i,j) such as: i=4 and j=1,2,3; j=4 and i=1,2,3 and is effected according to the table:

| (i,j) | k:i+j | sk | ck | k:=i−j | sk | ck |
|---|---|---|---|---|---|---|
| (1,4) | 5 | sin(5π/16) | cos(5π/16) | −3 | −sin(3π/16) | cos(3π/16) |
| (2,4) | 6 | sin(3π/8) | cos(3π/8) | −2 | −sin(π/8) | cos(π/8) |
| (3,4) | 7 | sin(7π/16) | cos(7π/16) | −1 | −sin(π/16) | cos(π/16) |
| (4,1) | 5 | sin(5π/16) | cos(3π/16) | 3 | sin(3π/16) | cos(3π/16) |
| (4,2) | 6 | sin(3π/8) | cos(3π/8) | 2 | sin(π/8) | cos(π/8) |
| (4,3) | 7 | sin(7π/16) | cos(7π/16) | 1 | sin(π/16) | cos(π/16) |

Family F7

The family F7 consists of the rotations reduced to the minimum:

DCT(0,0) = 2 F(0,0)
DCT(0,4) = 2 cos(π/4) F(0,4)
DCT(4,0) = 2 cos(π/4) F(4,0)
DCT(4,4) = 2 F(4,4)

In the description that has just been given of all the steps of the process of the invention for implementing a transform of the DCT, it appears clearly that the calculation load lies mainly at the level of the rotations.

Also, the permutation tends to symmetrize the input data. The imaginary part of the coefficients of the real value FFT will thus tend toward "0" when the correlation between the input data increases. Now, in certain practical applications such as slow speed image coding, the input signals are in general strongly correlated. The rotations will therefore apply to complex numbers whose real part is predominant and therefore should not modify the entropy of the signal to be coded. The suppression of these rotations thus introduces a new transform usable in image coding.

Specifically, this step consists of selectively cancelling at least some, or even all of the coefficients corresponding to the imaginary parts of the complex coefficients, at each one dimensional FFT in the steps 211 and 213. The criterion for selective cancellation can be a thresholding. The cancellation of a coefficient results for example in the non-execution of he corresponding addition and/or subtraction operations (see FIG. 6).

In addition, since the signals of images to be coded are real (basic hypothesis enabling the real value Fourier transform to be introduced into the calculation of the DCT), the spectrum of the real value Fourier transform is of square symmetry. It is then possible to take as other transform, the real value Fourier transform of the permuted signal. This transform has a very reduced arithmetic complexity since, for a size $8 \times 8$, it is generated in 32 multiplications and 320 additions, or a number of multiplications divided by 3.5 and a number of additions divided by 1.5.

Besides, its performances in compression are quite comparable to those of a Cosine transform.

For comparison, the performances in terms of number of additions and multiplications involved in the CHEN, LEE and VETTERLI processes on the one hand, and the two variants of the invention (with, then without rotations) on the other hand, are given in the table II, as a function of the size of the image blocks (N=8 to 64).

TABLE II

| | CHEN & AL line/colmn | | B.G LEE line/colmn | | FFTC line/colmn | | Invention W/rotations | | Without rotations | |
|---|---|---|---|---|---|---|---|---|---|---|
| N | mult | add | mult | add | mult | add | mult | add | mult | add |
| 8 | 256 | 416 | 192 | 464 | 192 | 464 | 112 | 470 | 32 | 320 |
| 16 | 1408 | 2368 | 1024 | 2592 | 1024 | 2592 | 672 | 2662 | 320 | 1920 |
| 32 | 7424 | 12416 | 5120 | 13376 | 5120 | 13376 | 3648 | 13766 | 2176 | 10496 |
| 64 | 37376 | 61696 | 24576 | 65664 | 24576 | 65664 | 18560 | 67462 | 12544 | 53760 |

In case of suppression of the matrix calculation step, the number of additions is reduced by $4 \times (N/2 - 1)^2$, or for example 36 additions suppressed for N=8. The number of multiplications remains the same.

Figure 18:
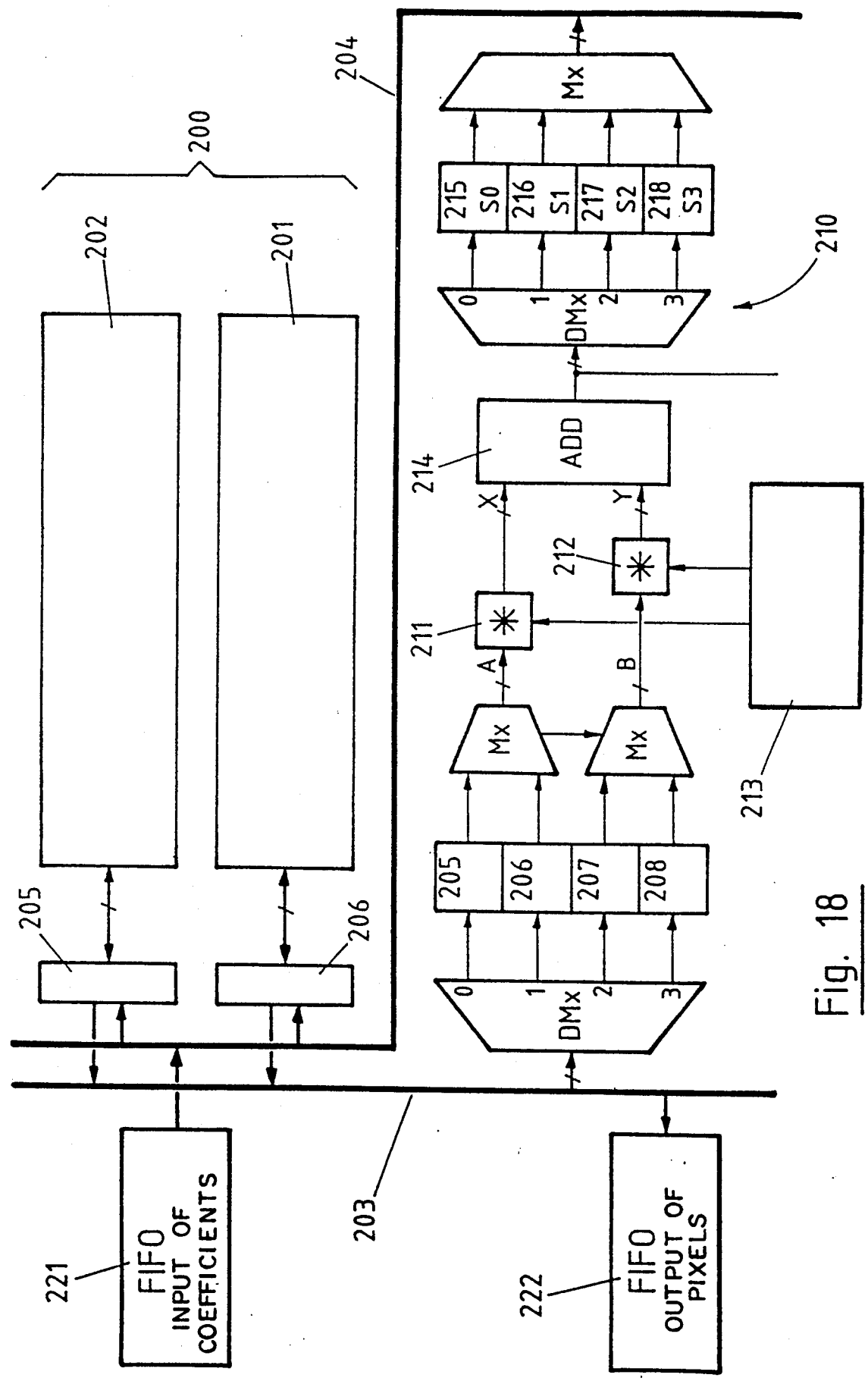
FIG. 18 shows an advantageous circuit for implementing the process of the invention.

FIG. 18 shows an advantageous circuit enabling the process of the invention to be implemented. As shown in FIG. 18, the DCT operator consists of a working storage 200 of 64 words, corresponding to the 64 elements of an 8 line and 8 column array, and of a "data path" 210 effecting additions and multiplications from the data read in the memory. Since the calculations are carefully arranged, the results of the calculations of the "data path" are written into the same addresses as the read addresses, in the working storage 200. One may say that the data is caused to "turn" between the memory 200 and the data path 210, until the final result is obtained. The data is introduced into and extracted from the DCT operator through input 221 and output 222 FIFO.

Considering the large number of elementary operations of the butterfly type to be effected [effecting for example (X0+X4) and (X0−X4)], the memory is divided into two equal parts 201 and 202 called MA and MB. MA stores the even lines of the block $8 \times 8$ whereas MB stores the odd lines. Also, in order to access simultaneously these two memories 201 and 202, either in reading, or in writing, MA and MB are connected to two busses 203 and 204, through registers 205 and 206, one 203 of the busses serving systematically in reading, the other bus 204 for writing into memory. The memories MA 201 and 202 are advantageously RAM memories with 32 words of 20 bits.

The data path consists mainly:

of four registers A0, A1, A2, A3 (205,206,207,208), storing the data read in memory (200,201,202), of two multiplexors (211,212) by the values "cosine", "sine" and various constants (0, +1, −1, ...) from a table in the read-only memory 213 This memory 213 is a ROM with 16 words of 12 bits containing the sine and cosine tables of the angles from 0 to $\pi/2$ at a pitch of $\pi/16$, of an adder 214, and of four output registers S0, S1, S2, S3 (215,216,217,218), storing the results from the adder 214 output. They have also multiplexer Mx and demultiplexer DMx modules.

The commands of the memory 200 and of the "data path" 210 are generated in such a way that the memory and the "data path" are used 100% of the time during the entire DCT calculation algorithm. To this end, the partition of the memory MA and MB, the four input registers A and the four registers B of the "data path" work in pipeline according to an interlacing 4—4 or 1—1, depending on whether or not the data to be processed comes from the same line.

The pipeline operation of the DCT operator is based on the partitioning of the data memory of 64 words (corresponding to the elements B(i,j) of a block B of size $8 \times 8$, (i=0,...,7, j=0,,7), into two memories MA and MB, MA containing the even lines, i=0,2,4,6 and MB containing the odd lines i=1, 3,5,7, this allowing either to read in the memory MA 201 and to write parallelly into the memory MB, or to read in the memory MB 202 and to write parallelly into the memory MA. This way the apparent access time of the memory is divided by 2.

The elementary operators are:

either a butterfly which from two elements A0 and A1 generates (A0+A1) and (A0−A1), or simple multiplication couples which from two elements A0,A1 generate $\alpha \times A0$ and $\beta \times A1$, or angle rotations $\Theta$ which from two elements A0 and A1 generate (A0cos($\Theta$)-A1sin($\Theta$)) and (A0Sin($\Theta$)+A1cos($\Theta$)) (see cell 101, FIG. 12).

Figure 19A:
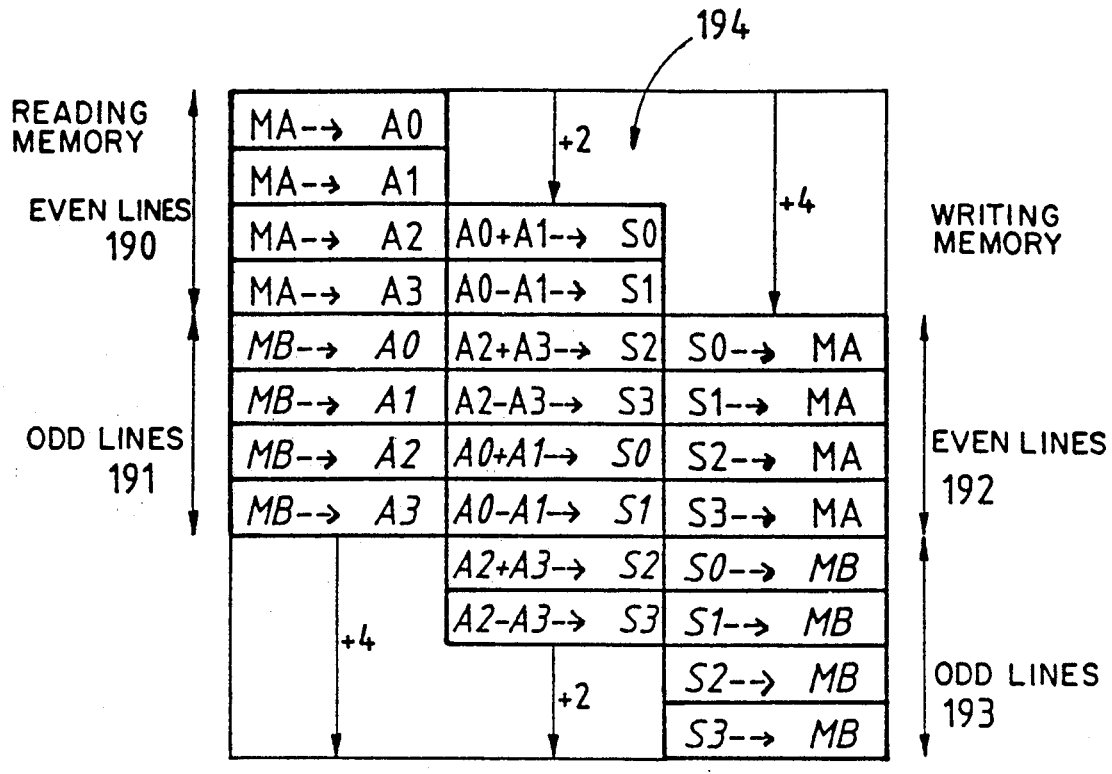
FIGS. 19A and 19B are diagrams of the pipeline operation of the circuit of FIG. 18, in case of interlacing 4/4 and 1/1, respectively.
Figure 19B:
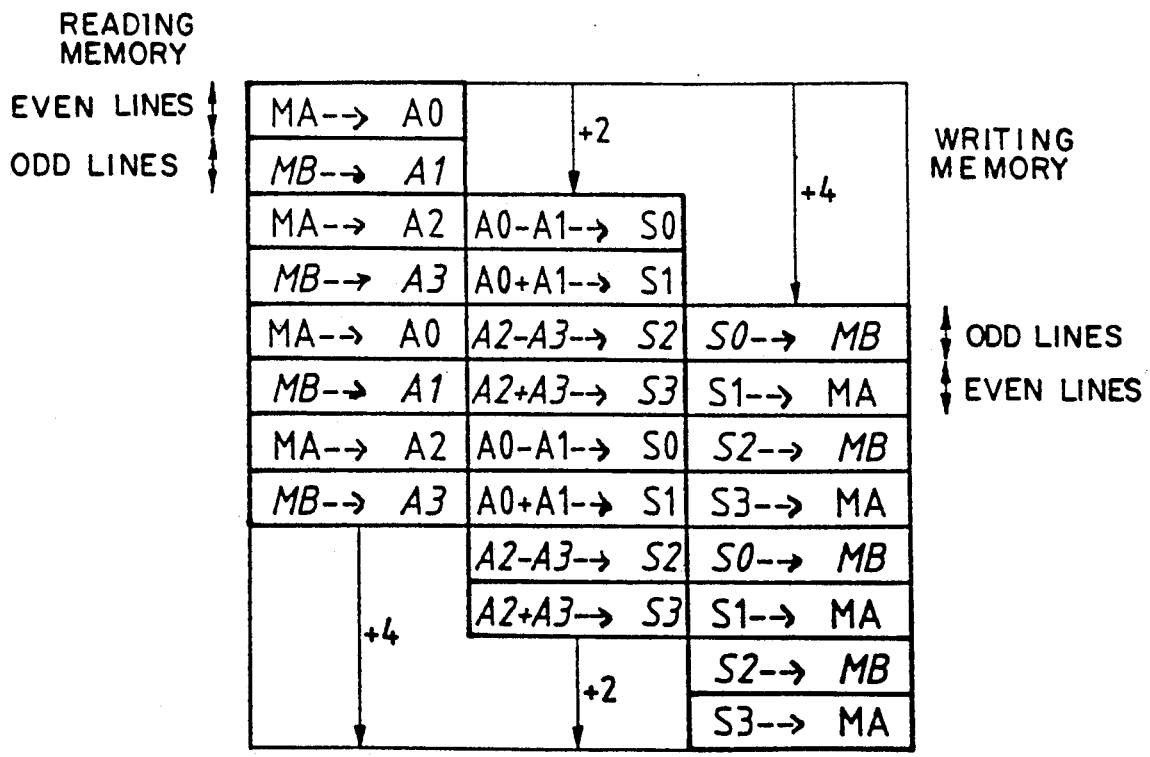

This is more clearly defined in FIGS. 19A and 19B wherein the left columns of the tables show the successive readings in memories MA and MB, the center columns show the calculation operations (additions, subtractions, multiplications) on the content of the registers, and the right columns show the successive writings into the memories MA, MB.

The operation shown on the FIG. 19A corresponds to the case where all the data originates in the same memory. This corresponds to the case where the operands of the addition and multiplication operations to be effected come from the same line, since the memories MA 201 and MB 202 correspond respectively to the storing of the coefficients of the even lines and of the odd lines. The only possible combination, allowing a pipeline operation, consists of reading successively four coefficients from the memory MA 201 (step 190), to place them in registers A0,A1,A2,A3 (205 to 208), then four coefficients in memory MB (step 191), and so forth, alternatingly. This regrouping of the readings by four permits then effecting, alternatingly, in each memory MA 201 and MB 202, the writings of the contents of the output registers S0,S1,S2,S3 (215 to 218), of the steps 192 and 193 of the FIG. 19A. The content of the registers S0,S1,S2,S3 is achieved by application 194 of the elementary operators defined earlier on the content of the registers A0,A1,A2,A3. The pipeline operation thus permits using each memory MA and MB 100% of the time.

In the case diagrammed in FIG. 19B, the operands of the addition or subtraction operations originate one in an even line and the other in an odd line. In this case, the interlacing, for the reading of the memories MA 201 and MB 202, is a 1—1 interlacing. The meaning of the symbols used in FIG. 19B corresponds to the symbols of FIG. 19A.

It is to be noted finally that the operations according to the interlacing "1—1" (FIG. 19B) can be chained in pipeline, without loss of time, with the operations according to the interlacing "4—4" (FIG. 19A).

We claim:

1. Process of compression of data representative of an image signal, of the type consisting of decomposing the image into blocks forming arrays of pixels, of effecting a mathematical operation of transformation on each array of pixels according to a transform making it possible to obtain a resulting array of elements representative of the activity of the image, and of eliminating in each resulting array the elements of little psychovisual relevance by thresholding in relation to an array of reference thresholds, process characterized in that the said mathematical operation of transformation consists of the steps of:

transposing the elements of the array of pixels by permutation of the indices of the said elements, so as to symmetrize the signal;

applying an interlacing of two series of one dimensional real value FFT, bearing successively on each line of the permuted array of pixels, then on each of the columns of the intermediate array resulting from the first series of one dimensional FFT.

2. Process according to claim 1 characterized in that at least part of the imaginary coefficients that are obtained after at least one of the two series of one dimensional real value FFT are cancelled.

3. Process according to claim 1 wherein said interlacing of two series of one dimensional real value FFT are replaced with a two dimensional real or complex value FFT.

4. Process according to the claim 1 characterized in that at least one of the two one dimensional FFT is followed by an operation of matrix transposition with bit reverse.

5. Process according to claim 4 characterized in that on the transformed array resulting from the two interlaced one dimensional FFT a matrix calculation is effected designed to reconstitute the array transformed by complex value FFT corresponding to the said initial transposed array of pixels.

6. Process according to the claim 5 characterized in that the said array transformed by complex value FFT is subjected to a treatment of rotations, so that a resulting array is obtained corresponding to the real value DCT transform of the initial array of pixels.

7. Process according to claim 5 wherein said interlacing of two series of one dimensional real value FFT are replaced with a two dimensional real or complex value FFT.

8. Process according to any of the claims 1 to 6 characterized in that the law of permutation of the indices of the elements of the array of pixels is combined with a scanning of the array being chosen in the group comprising a line to line scan of the array and a zigzag scan of the array.

9. Process according to claim 3 or 7 characterized in that at least part of the imaginary coefficients that are obtained after said two-dimensional real or complex value FFT are cancelled.

10. Device to implement the process according to any one of the claims 1 to 6, 3, 7 or 2 characterized in that it comprises two distinct memory units, the said memory units cooperating with a data path effecting in pipeline the interlaced operations of reading coefficients in the memories, the calculation operations on the said coefficients, and the interlaced writing operations of the resulting coefficients in the memory units, so as to effect the steps of the process by successive passages of the coefficients in the said data path.

* * * * *